(12) United States Patent
Agarwal et al.

(10) Patent No.: US 8,275,099 B2
(45) Date of Patent: Sep. 25, 2012

(54) WORLD WIDE TELECOM WEB VOICE APPLICATIONS

(75) Inventors: Sheetal K. Agarwal, Bangalore (IN); Arun Kumar, New Delhi (IN); Priyanka Manwani, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 479 days.

(21) Appl. No.: 12/547,883

(22) Filed: Aug. 26, 2009

(65) Prior Publication Data

US 2011/0051911 A1   Mar. 3, 2011

(51) Int. Cl.
H04M 1/64   (2006.01)
(52) U.S. Cl. .................. 379/88.17; 379/67.1; 704/246
(58) Field of Classification Search .............. 379/88.17, 379/88.01, 88.18, 67.1; 704/246
See application file for complete search history.

(56) References Cited

U.S. PATENT DOCUMENTS

| | | | |
|---|---|---|---|
| 6,578,000 B1 | 6/2003 | Dodrill et al. | |
| 7,334,050 B2 | 2/2008 | Zondervan et al. | |
| 2005/0091057 A1 | 4/2005 | Phillips et al. | |
| 2008/0043725 A1 | 2/2008 | Wan | |
| 2008/0144783 A1* | 6/2008 | Kumar et al. | 379/88.13 |
| 2008/0228488 A1 | 9/2008 | Berkowitz et al. | |

OTHER PUBLICATIONS

Agarwal et al., HSTP: hyperspeech transfer protocol. Proceedings of the eighteenth conference on Hypertext and hypermedia, 2007. http://portal.acm.org/citation.cfm?id=1286240.1286262.
Banerjee et al. Providing middleware support for the control and co-ordination of telecom mashups. Proceedings of the 2007 Workshop on Middleware for next-generation converged networks and applications.
Kumar et al. Voiserv: Creation and delivery of converged services through voice for emerging economies. In WoWMoM'07 Proceedings of the 2007 International Symposium on a World of Wireless, Mobile and Multimedia Networks, Finland, Jun. 2007.
http://speakrightframework.blogspot.com.
http://www.castor.org.
http://java.sun.com/javaee/javaserverfaces/overview.html.
http://www.dotnetnuke.com.
http://velocity.apache.org/.
http://www.romaframework.org/.
Agarwal et al. The World Wide Telecom Web Browser. In WWW '08: Poster Proceedings of the 17th International World Wide Web Conference, Beijing, China, 2008.
Agarwal et al. VoiKiosk: Increasing Reachability of Kiosks in Developing Regions. In WWW '08: Poster Proceedings of the 17th International World Wide Web Conference, Beijing, China, 2008.
Akolkar et al. Reusable Dialog Component Framework for Rapid Voice Application Development. In SIGSOFT Component Based Software Engineering, Missouri, USA, May 2005.

(Continued)

Primary Examiner — Gerald Gauthier
Assistant Examiner — Simon King
(74) Attorney, Agent, or Firm — Ryan, Mason & Lewis, LLP

(57) ABSTRACT

A framework for creating a voice application in a world wide telecom web (WWTW) is provided. The techniques include using a pre-defined schema to create one or more voice application templates, using the one or more voice application templates to generate a first version of the voice application, using the first version of the voice application and a library of one or more components to generate a deployable version of the voice application and deploying the deployable version of the voice application onto a run-time execution engine.

19 Claims, 14 Drawing Sheets

OTHER PUBLICATIONS

Brewer et al. The Challenges of Technology Research for Developing Regions. IEEE Pervasive Computing, 5(2):15-23, 2006.

Chamberlain et al. Speech user interface guide. 2006.

Kotkar et al. An Audio Wiki for Publishing User-Generated Content in the Developing World. In HCI for Community and International Development (Workshop at CHI 2008), Florence, Italy, Apr. 2008.

Kumar et al. Organizing the Unorganized—Employing IT to Empower the Under-privileged. In WWW '08: Proceedings of the 17th International World Wide Web Conference, Beijing, China, 2008.

Kumar et al. WWTW: The World Wide Telecom Web for Developing Regions. In ACM SIGCOMM Workshop on Networked Systems for Developing Regions, Aug. 2007.

Mili et al. Enterprise frameworks: issues and research directions. Softw. Pract. Exper., 32(8):801-831, 2002.

Panchard et al. COMMON—Sense Net: Improved Water Management for Resource-Poor Farmers via Sensor Networks. In International Conference on Information and Communication Technologies for Development, Berkeley, USA, May 2006.

Pawlitzek. Introducing Hamlets. http://www-128.ibm.com/developerworks/web/library/wa-hamlets/ Mar. 2005.

Rawsthorn. Design for the Unwealthiest 90 Percent. http://www.iht.com/articles/2007/04/27/arts/design30.php Last accessed Nov. 2008.

Schwabe et al. Engineering web applications for reuse. IEEE MultiMedia, 8 (1):20-31, 2001.

Sherwani et al. Voicepedia: Towards speech-based access to unstructured information, interspeech 2007. In Proc. Interspeech, 2007.

Yu et al. A Framework for Rapid Integration of Presentation Components. In WWW '07: Proceedings of the 16th International World Wide Web Conference, Banff, Canada, 2007.

I. Singh, B. Stearns, M. Johnson, G. Murray, J. Inscore, L. Demichiel, N. Kassem, R. Sharma, R. Ortigas, R. Monzillo, S. Brydon, T. Ng, and V. Ramachandran. Designing Enterprise Applications with the J2EETM Platform, Second Edition. http://java.sun.com/blueprints/guidelines/designing_enterprise_applications_2e/ Last accessed Nov. 2008.

http://sourceforge.net/projects/keel/.

http://www.genesyslab.com/products/genesys_voice_platform.asp.

I. W. Stats. World Internet Users and Population Stats. http://www.internetworldstats.com/stats.htm, Jun. 2008.

\* cited by examiner

FIG. 3

```
<element name="TemplateDefinition" type="tns:TemplateType"></element>
<complex Type name="TemplateType">
  <sequence>
    <element name ="CompositeComponent" type="tns:CompositeComponentType"
      minOccurs="1" maxOccurs="1"> </element>
  </sequence>
  <attribute name="Name" type="string"></attribute>
  <attribute name="Version" type="string"></attribute>
</complexType>
```
— 302

FIG. 4

```
<complexType name= "CompositeComponentType">
  <choice maxOccurs="unbounded" minOccurs="1">
    <sequence>
      <element name="CompositeSequence" type="tns:CompositeComponentType"
        minOccurs="1" maxOccurs="unbounded"> </element>
    </sequence>
    <choice>
      <element name="CompositeChoice" type= "tns:CompositeComponentType"
        minOccurs="1" maxOccurs="unbounded"> </element>
    </choice>
    <element name="LeafComponent" type="tns:ComponentType"
      maxOccurs="unbounded" minOccurs="1"> </element>
  </choice>
  <attribute name="Name" type="string"></attribute>
  <attribute name="Description" type="string"></attribute>
  <attribute name="Label" type="string"></attribute>
</complexType>
```
— 402

FIG. 5

```
<complexType name="UIComponentType" >
  <complexContent>
    <extension base= "tns:ComponentType">
      <sequence>
        <element name="PreProcRef" type="tns:methodCallType"
          maxOccurs="1" minOccurs="0"> </element>
        <element name="PostProcRef" type="tns:methodCallType"></element>
        <element name="InputToApp" type="tns:inputType"
          maxOccurs= "unbounded" minOccurs="0"> </element>
        <element name="OutputToApp" type="tns:outputType"
          maxOccurs="unbounded" minOccurs="0"></element>
        <element name="Description" type="string"></element>
        <element name="NavigationalProperties"
          type= "tns:NavigationalPropertiesType"> </element>
        <element name="tag" type="string" maxOccurs="unbounded"
          minOccurs="0"> </element>
      </sequence>
      <attribute name="Renderer" type="tns:RendererType"></attribute>
    </extension>
  </complexContent>
</complexType>
```

<tns:CompositeChoice Name="KioskMainMenu" Label=" ">
<tns:CompositeSequence Name="AgriService"
Description="Agriculture discussion forums, announcements, FAQs and expert advice operation" Label=" ">
<tns:CompositeChoice Name="Agri Menu">
  <tns:LeafComponent Name="FAQList" xsi:type="tns:ListType" Label=" " NumberOfDimensions="2">
  <tns:PreProcRef xsi:type="tns:ListMethodCallType">
  <tns:methodName>getElements</tns:methodName>
  <tns:methodParams>
    <tns:category>OPEN</tns:category>
    <tns:numberOfElementsIn1Dim>5</tns:numberOfElementsIn1Dim>
    <tns:numberOfElementsIn2Dim>1</tns:numberOfElementsIn2Dim>
  </tns:methodParams>
  </tns:PreProcRef>
  <tns:PostProcRef><tns:methodName>tns:methodName</tns:methodName> </tns:PostProcRef>
  <tns:InputToApp Label=" "></tns:InputToApp>
  <tns:OutputToApp>
    <tns:dataSink>tns:dataSink</tns:dataSink>
    <tns:parameterList>tns:parameterList</tns:parameterList>
  </tns:OutputToApp>
  <tns:Description> This is an FAQ on agriculture that is maintained by the voicesite administrator
  </tns:Description>
  <tns:NavigationalProperties>
    <tns:Help>http://tempuri.org</tns:Help>
    <tns:Forward>http://tempuri.org</tns:Forward>
    <tns:Back>http://tempuri.org</tns:Back>
    <tns:Home>http://tempuri.org</tns:Home>
    <tns:ErrorHandler>http://tempuri.org</tns:ErrorHandler>
  </tns:NavigationalProperties>
  <tns:tag>VillagePortalFAQ</tns:tag>
</tns:LeafComponent>
.........
```

FIG. 9

```
1 ⊟ [e] tns:Template                    (CompositeComp        ┐ 902
      ⓐ xmlns:cal                      http://www.exar
      ⓐ xmlns:tns                      http://www.exar
      ⓐ xmlns:xml-method               http://www.exar
      ⓐ xmlns:xsi                      http://www.w3.
      ⓐ xsi:schemaLocation             http://www.exar
   ⊟ [e] tns:CompositeComponent        ((CompositeSequ
         ⓐ Name                        VillageMain
      ⊟ [e] tns:CompositeSequence      ((CompositeSequ
            ⓐ Name                     MainSequence
         ⊞ [e] tns:LeafComponent       (((PreProcRef, P
         ⊟ [e] tns:CompositeChoice     ((CompositeSequ
               ⓐ Name                  KioskMainMenu
               ⓐ Label                 KioskMenu
            ⊟ [e] tns:CompositeSequence ((CompositeSequ
                  ⓐ Name               AgriService
                  ⓐ Description        Agriculutre discu
                  ⓐ Label              Vyavasaayam
               ⊟ [e] tns:CompositeChoice ((CompositeSequ
                     ⓐ Name            Agri Menu
                  ⊟ [e] tns:CompositeSequence ((CompositeSequ
                        ⓐ Name         FAQ
                        ⓐ Label        Mahiti
                     ⊞ [e] tns:LeafComponent (((PreProcRef, P
                     ⊞ [e] tns:LeafComponent ((PreProcRef, Po
                  ⊞ [e] tns:LeafComponent ((PrefProcREf, Po
               ⊟ [e] tns:CompositeSequence ((CompositeSequ
                     ⓐ Name            HealthService
                     ⓐ Label           Aarogyam
                  ⊞ [e] tns:LeafComponent ((PreProcRef. Po
```

FIG. 11

```
<?xml version="1.0" encoding="UTF-8"?><vxml xmlns=
  "http//www.w3c.org/2001/vxml"version="2.0">
<form>
<catch event="connection.disconnect">
<assign name="sr__res" expr="1"/>
<submit next="router.jsp" namelist="sr__res" method="get"/><exit/>
</catch>
<var name="sr__res" expr="'0'"/>
<field name="field1" >
<grammar type="application/srgs+xml" src="C:\sro1\KioskMainMenu.grxml"/>
<noinput>I'm sorry I didn't hear anything. What item would you like? </noinput>
<noinput count="2">I still didn't hear anything. Please say an item. </noinput>
<nomatch>I didn't get that. What item would you like? </nomatch>
<nomatch count="2" >I still didn't understand. Please say an item you would like?
  </nomatch>
<prompt>Please select from the following VAgri health</prompt>
<nomatch count="3">
<assign name="sr__res"" expr="'3'"/>
<submit next="router.jsp" namelist="field1 sr__res" method="get"/>
</nomatch>
<noinput count="3">
<assign name="sr__res" expr="'3'"/>
<submit next="router.jsp" namelist="field1 sr__res" method="get"/>
</noinput>
<filled>
<var name="sr__conf" expr="lastresult$.confidence"/>
<submit next="router.jsp" namelist="field1 sr__res sr__conf" method="get"/>
</filled>
</field>
</form>
</vxml>
```

WORLD WIDE TELECOM WEB VOICE APPLICATIONS

FIELD OF THE INVENTION

Embodiments of the invention generally relate to information technology (IT), and, more particularly, to telecom web applications.

BACKGROUND OF THE INVENTION

The World Wide Telecom Web (WWTW) (also known as Spoken Web) is emerging as an alternate web for the under-privileged, navigable entirely through a voice based interface using an ordinary telephone. A node in the WWTW graph is a voice application called a VoiceSite and is accessible over a simple phone call. VoiceSites may be hyperlinked through Hyperspeech Transfer Protocol (HSTP) or through an ordinary call transfer facility of telephony networks.

A VoiceSite is formed by one or more VoicePages (for example, VoiceXML files) that are hosted and co-located in the network. VoiceSites contain information or the application flow with which a user can interact by spoken language. Subscribers can expose custom information and services through VoiceSites. Individual users and enterprises can also set up personal and enterprise VoiceSites. Links between these sites creates a network of VoiceSites.

A VoiceSite is represented by an associated phone number and can be accessed from any touch-tone phone instrument (which can include mobiles and most landlines) through an ordinary phone call to that number. A VoiceSite could be an individual's VoiceSite in which case it gets deployed against his phone number. In situations, where a VoiceSite represents a group, it gets deployed against a phone number accessible to the entire group. Additionally, VoiceSites can be created through the use of other special VoiceSites. These creator VoiceSites are referred to as meta-VoiceSites.

However, several challenges need to be addressed for large scale development, deployment, inter-working and usability of such VoiceSites. For example, the set of users that need to be supported vary from software developers to illiterate rural farmers. Also, the fact that the primary user interface is voice based and over telephony presents its own challenges and opportunities. Further, most existing voice application frameworks make it difficult to separate navigational flow from process flow, making systematic application development even more difficult.

SUMMARY OF THE INVENTION

Principles and embodiments of the invention provide techniques for generating world wide telecom web voice applications. An exemplary method (which may be computer-implemented) for creating a voice application in a world wide telecom web (WWTW), according to one aspect of the invention, can include steps of using a pre-defined schema to create one or more voice application templates, using the one or more voice application templates to generate a first version of the voice application, using the first version of the voice application and a library of one or more components to generate a deployable version of the voice application and deploying the deployable version of the voice application onto a run-time execution engine.

One or more embodiments of the invention or elements thereof can be implemented in the form of a computer product including a tangible computer readable storage medium with computer usable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 3 is a diagram illustrating a template type, according to an embodiment of the present invention;

FIG. 4 is a diagram illustrating a composite component type, according to an embodiment of the present invention;

FIG. 5 is a diagram illustrating a UIComponent Type, according to an embodiment of the present invention;

FIG. 7 is a diagram illustrating a fragment of a sample template definition, according to an embodiment of the present invention;

FIG. 9 is a diagram illustrating a screenshot of the corresponding XML file to the example Community Portal template instance, according to an embodiment of the present invention;

FIG. 11 is a diagram illustrating a sample VXML generated by Speakright, according to an embodiment of the present invention;

DETAILED DESCRIPTION

Figure 1:
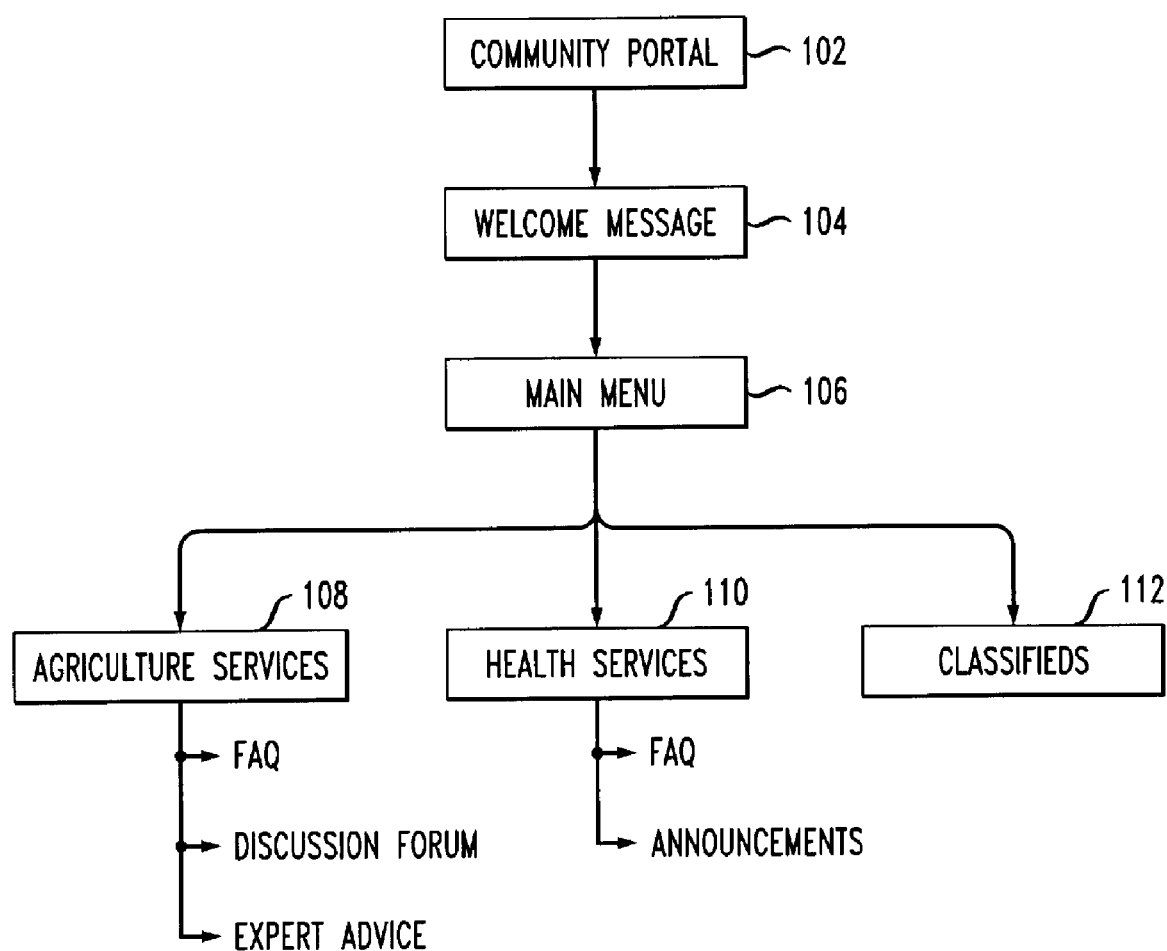
FIG. 1 is a diagram illustrating a simplified Community Portal VoiceSite, according to an embodiment of the present invention.

Principles of the invention include a telecom web application framework (TWAF), an application framework for creating, deploying and managing interactive telecom web applications (that is, VoiceSites) as well as meta-VoiceSites or meta websites that are used to configure and instantiate templates into VoiceSites or websites. As detailed herein, a meta-VoiceSite is a telecom web application that enables the end-user to create another telecom web application (for example, a VoiceSite) through a voice based interface, in addition to a graphical user interface (GUI) or application programming interface (API) as supported by traditional web application frameworks. Further, TWAF also enables third parties to plug-in their extended templates.

In one or more embodiments of the invention, TWAF supports voice over telephony as a primary interface for creation of VoiceSites to support non IT-literate users, in addition to supporting APIs and GUIs for the developers. Additionally, the techniques described herein include creating VoiceSites and equivalent websites using a template based approach. Such techniques can include, for example, using a pre-defined schema to create VoiceSite templates, as well as using a VoiceSite template to generate the desired VoiceSite/website or a meta-VoiceSite/meta-website. One or more embodiments of the invention can also include using the meta-VoiceSite/meta-Website and a library of pre-built components, generating a deployable version of the desired VoiceSite/Website. Further, one can deploy such a version onto a run-time execution engine.

VoiceSites thus are analogous to websites in the WWW in terms of functionality and differ primarily in their user interface (that is, voice based interaction over a phone call for VoiceSites, as compared to a web browser on a personal computer (PC) for websites). Similar to Hypertext Transfer Protocol (HTTP) links on the Web, VoiceSites can also be linked to other VoiceSites through Hyperspeech Transfer Protocol (HSTP). Such an interconnection of VoiceSites opens several possibilities for telephony voice applications and can create a web parallel and complimentary to the existing World Wide Web, referred to as the World Wide Telecom Web (WWTW).

One or more embodiments of the invention include an application framework for WWTW that can cater to different kinds of users. For example an application programming interface (API) and/or a graphical user interface (GUI) can be provided to create VoiceSites in a systematic and structured manner. Also, a voice user interface (VUI) can be provided to enable non-IT savvy users to be able to create their VoiceSites. Such VUIs for creating VoiceSites are also VoiceSites called meta-VoiceSites. Additionally, an application framework as detailed herein can also provide an API and/or a GUI to developers for creating these meta-VoiceSites.

In one or more embodiments of the invention, the deployable/target generated application/site is a website instead of a voice site. Similarly, the meta-site could be a website instead of a voice site. As such, there are multiple implementation combinations. For example, the first version of the voice application can be a voice site and the deployable version of the voice application can be a voice site. The first version of the voice application can be a voice site and the deployable version of the voice application can be a website. The first version of the voice application can be a voice site and there can be two deployable versions of the voice application: a website and a voice site. Also, the first version of the voice application can be a website and the deployable version of the voice application can be a website. The first version of the voice application can be a website and the deployable version of the voice application can be a voice site. Further, the first version of the voice application can be a web site and there can be two deployable versions of the voice application: a website and a voice site.

The APIs/GUIs of one or more embodiments of the invention are capable of generating website equivalents of the VoiceSites for better integration of telecom web with the existing World Wide Web. In addition to the development life-cycle, the application framework can support automatic deployment of generated VoiceSites (and equivalent websites) on a run-time engine. Further, the compile time VoiceSite creation aspects of the framework as well as the run-time engine are able to integrate with existing IT systems such as databases, web services, etc. Also, one or more embodiments of the invention are flexible to allow third party providers to add new modules to the framework for extension, customization and for differentiation among competing providers.

A VoiceSite can belong to and represent an individual or it can represent a group or an entire community. By way of example, consider the example of a community VoiceSite that serves the purpose of a Community Portal. The Community Portal VoiceSite is meant to be a local information sharing hub for a community such as a village and is managed by a member of the community designated as the Community Portal administrator. A Community Portal can offer information and services such as, for example, an updated local bus/train schedule, doctor's visit timings in the local health center, movies being played in the nearby theatre, new government schemes launched, upcoming events for the village and classifieds for jobs, matrimonials, equipment rentals etc. For illustrative purposes consider a simplified view of a Community Portal as depicted in FIG. 1.

FIG. 1 is a diagram illustrating a simplified Community Portal VoiceSite, according to an embodiment of the present invention. By way of illustration, FIG. 1 depicts a progression from a Community Portal 102, to a welcome message 104, to a main menu 106, to agriculture services 108 (which can include FAQs, a discussion forum and expert advice), health services 110 (which can include FAQs and announcements) and/or classifieds 112.

FIG. 1 illustrates the overall structure of the application that includes the following options: 1) Agricultural Consultancy Service, which allows villagers to browse an agriculture FAQ applicable for the village and post their questions to be answered by qualified experts. 2) Health Center Service, which provides announcements related to upcoming health events, disease outbreak notifications, other health related messages, as well as a locally relevant medical FAQ. 3) Classifieds, which includes a section where people can record their professional and personal advertisements and browse through advertisements posted by other villagers.

As to be understood by one skilled in the art, FIG. 1 depicts merely one example belonging to a class of Community Portal VoiceSites. Other examples can include, by way of illustration and not limitation, an enterprise portal, a professional society VoiceSite, a social networking portal, a non-governmental organization's VoiceSite, etc. Additionally, by way of example, other classes of VoiceSites include individual's VoiceSites (not belonging to a group).

In one or more embodiments of the invention, the TWAF framework enables application integration to compose VoiceSite functionality from existing enterprise logic components, and also performs integration of user interface (UI) components. Additionally, TWAF caters to naïve users in addition to developers and voice-based interfaces form a primary component of the user interface.

Figure 2:
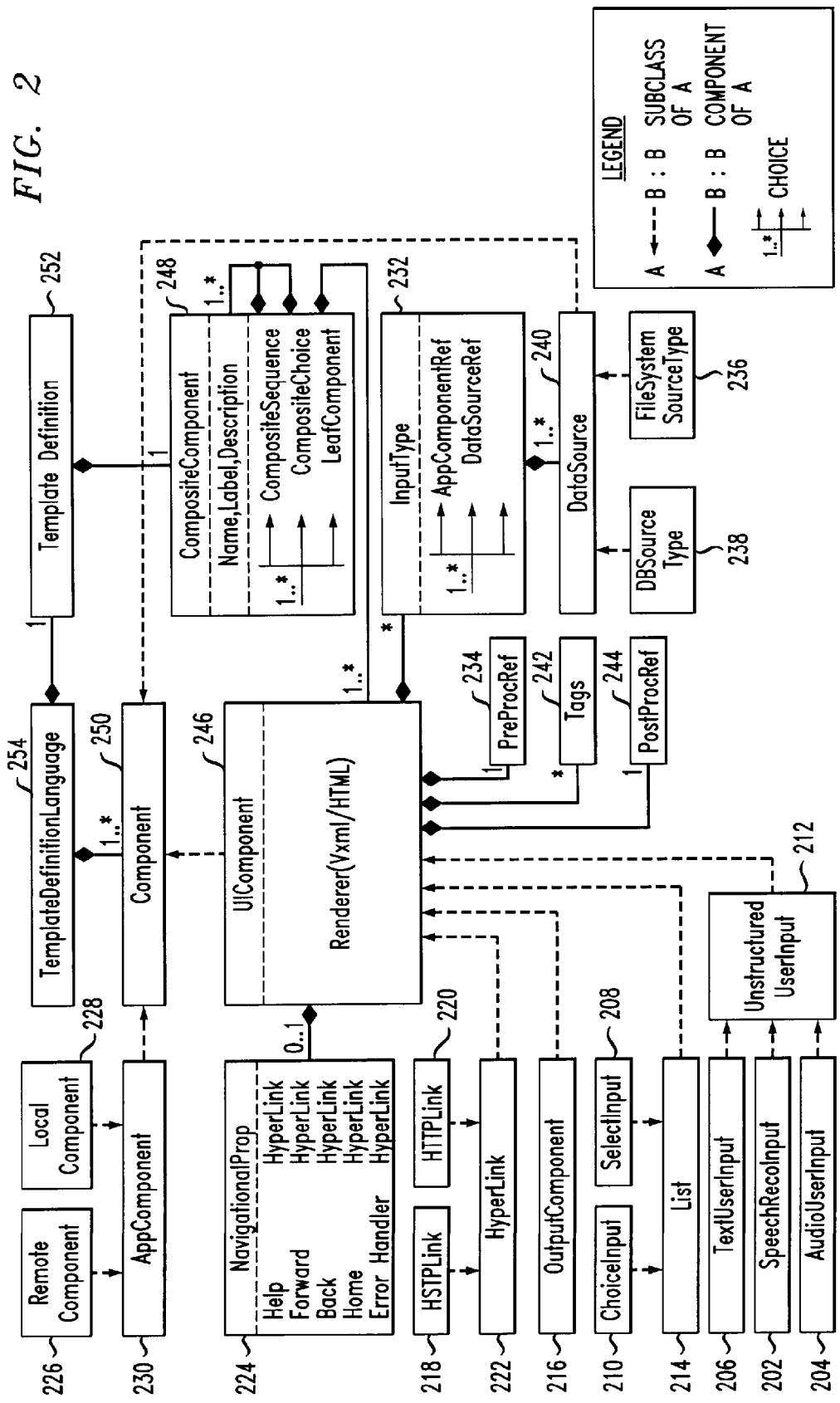
FIG. 2 is a diagram graphically illustrating a template definition schema, according to an embodiment of the present invention.

FIG. 2 is a diagram graphically illustrating a template definition schema, according to an embodiment of the present invention. By way of illustration, FIG. 2 depicts SpeechRecoInput 202, AudioUserInput 204 and TextUserInput 206, which are provided to an unstructured user input component 212. Also, SelectInput 208 and ChoiceInput 210 are provided to a list component 214, and HSTPLink 218 and HTTPLink 220 are provided to a hyperlink component 222. The unstructured user input component 212, the list component 214, an output component 216 and the hyperlink component 222 are provided to a user interface component 246.

Additionally, a navigational properties component 224, a PreProcRef component 234, an input type component 232, a tags component 242, a PostProcRef component 244 and a composite component 248 are also provided to the user interface component 246. A DBSourceType component 238 and a FileSystemSourceType component 236 are provided to a DataSource component 240, which can be provided to the input type component 232.

Also, a remote component 226 and a local component 228 are provided to an application component 230, which can be provided (along with the data source component 240) to component 250. Further, the composite component 248 is provided to a template definition component 252, which can be provided (along with component 250) to the template definition language 254.

FIG. 2 depicts elements of the schema for the VTDL. As shown, VTDL includes various elements pertaining to different aspects of the structure of a VoiceSite template, including a template definition and a library of components. Template Definition includes a composite component (see, for example, FIG. 4), which is a choice between a sequence of one or more composite-components, a choice of one or more composite components and a leaf component. This recursive nature of the composite component provides flexibility for creating different kinds of template designs.

FIG. 3 is a diagram illustrating a template type 302, according to an embodiment of the present invention. A LeafComponent is composed of one or more UIComponent Types alone. A VoiceSite template is therefore essentially a collection of various kinds of UIComponents knit together in an interaction hierarchy as specified by the designer. A UIComponentType is designed to capture the nuances of user interface controls specific to the modality specified, that is, speech or text. In addition, a UIComponentType can include a reference to one or more AppComponentTypes and/or one or more DataSourceComponentTypes.

FIG. 4 is a diagram illustrating a composite component type 402, according to an embodiment of the present invention, and FIG. 5 is a diagram illustrating a UIComponent type 502, according to an embodiment of the present invention.

The AppComponentType captures the specification of components that implement enterprise logic and can be encapsulated in a locally available component or a remote entity such as a web service. The DataSourceComponent type provides a mechanism to specify various data sources that can be utilized by the VoiceSite and can include databases, filesystem, etc. Separating the specification of UIComponent from AppComponent and DataSourceComponent enables enterprise logic to remain separate from presentation logic. In one or more embodiments of the invention, therefore, TWAF enables Model-View-Controller architecture based VoiceSite development.

Each UIComponentType includes an attribute that specifies the renderer to be used. VXML and HTML are currently supported. Also, a UIComponentType is composed of six components, namely, InputType, OutputType, PreProcRef, PostProcRef, Tags and optional NavigationalProperties element. The InputType and OutputType elements can be references to those AppComponents and DataSourceComponents associated with the template that this component needs to use to get some input data or to send some output data, respectively. PreProcRef and PostProcRef specify actions to be performed before and after the use of this component, respectively. They include method calls to be invoked on an AppComponent or fetch/store data from a DataSourceComponent available to the UIComponent from the InputType and OutputType elements. Tags provide a mechanism to specify meta information about the component which could be used later to index the VoiceSite for searching purposes. NavigationalProperties capture the standard navigational, help or exception handling hyperlinks defined for this component.

The UIComponent element is further derived into various types. The OutputUIComponentType allows specifying a UI control that renders an output to the user in the form of text, audio, video, short message service (SMS), multimedia messaging service (MMS) or an image. It has an attribute OutputResRef that points to the location of the resource that is to be output to the user. A ListType component represents single or multidimensional lists. A list can be editable, sequential or a random (multi-)select list, and the attribute NumberofDimensions determines the dimensionality of the list. An UnstructuredInputType is a UI component type for capturing input in the form of audio recording, free text or speech input to be recognized.

Finally, a subclass of UIComponent is a HyperLink component that could either represent a HTTP link or an HSTP link. It has a LinkText attribute that represents the text that is presented in a graphical user interface (GUI) application or the grammar that is used in a voice application and is spoken to activate the link. It also contains a LinkURI element that points to the resource to which the hyperlink links. Third party vendors can extend this schema to define their own components referred to as extended templates, described herein.

In one or more embodiments of the invention, using VTDL, the developers can create template definitions. A template definition captures the structure of a class of VoiceSites to be created and is also an XML document that specifies the UI components of the application and how they are interlinked to form an application flow. The UI components typically refer to other application components or data source components that are defined in the VTDL and have a realization available in the components repository of the framework. The instances of these application components and data source components, when included later, define the run-time behavior of the VoiceSite generated from the template. The UI components in the template definition are abstract in nature and are rendered based on the deployment platform. For example, for a voice application, the components are rendered in VXML whereas for a web based application they are rendered as HTML.

A template enables mass creation of a class of applications with similar features and the template definition captures all possible features of that application class. For creation of a template instance, the developer or the end user can specify which features to retain and configures those with data specific to him (through the interface provided). For each of the components included, the corresponding component realization that renders or invokes this component is available in the components repository of the framework. The template definition for the Community Portal scenario introduced earlier, for example, is shown in FIG. 6 and FIG. 7.

Figure 6:
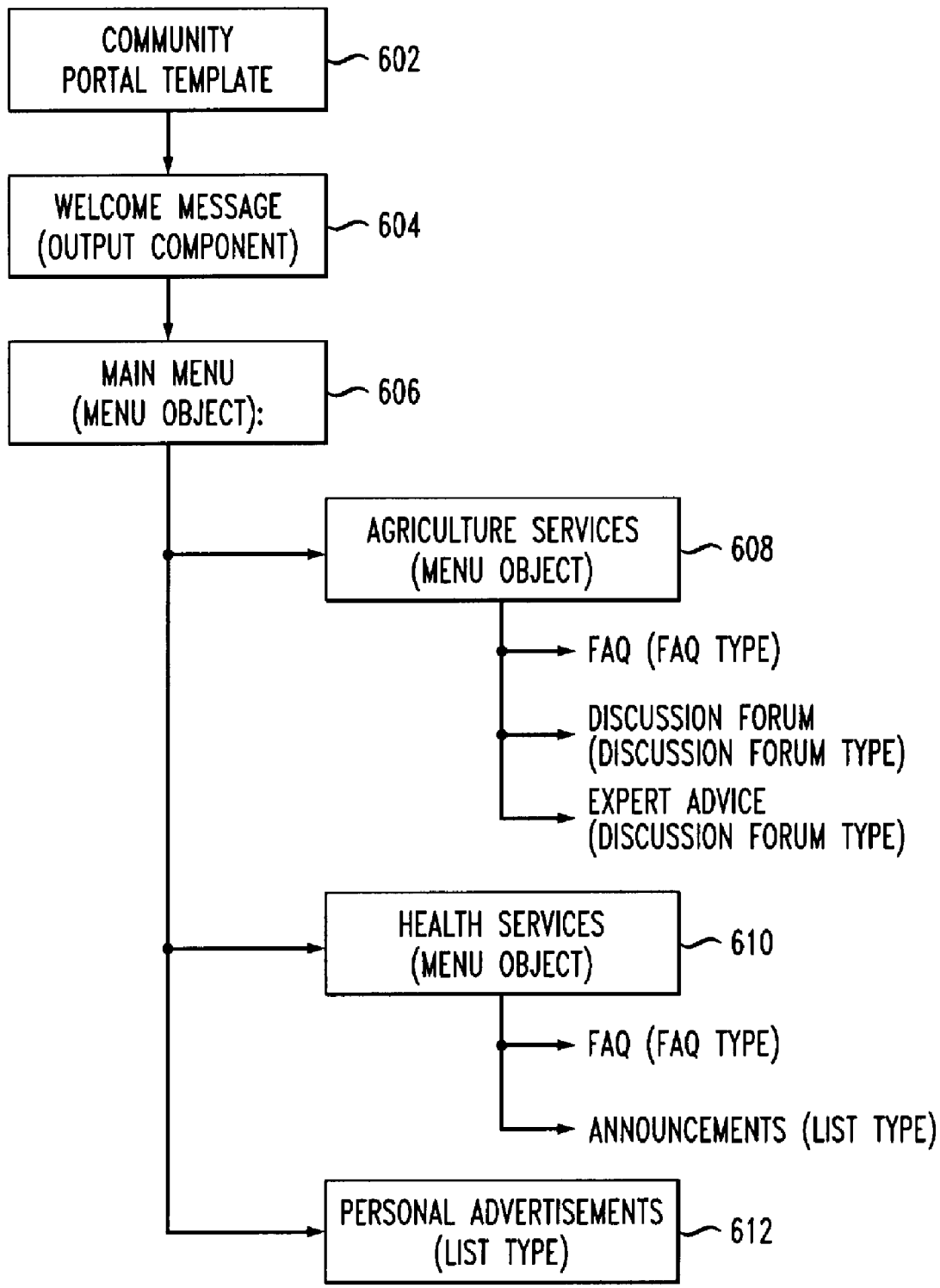
FIG. 6 is a diagram illustrating the structure of an example template definition for Community Portal, according to an embodiment of the present invention.

FIG. 6 is a diagram illustrating the structure of an example template definition for Community Portal, according to an embodiment of the present invention. By way of illustration, FIG. 6 depicts a progression from a Community Portal template 602, to a welcome message (output component) 604, to a main menu (menu object) 606, to agriculture services (menu object) 608 (which can include FAQs, a discussion forum and expert advice), health services (menu object) 610 (which can include FAQs and announcements) and/or classifieds (list type) 612.

FIG. 7 is a diagram illustrating a fragment of a sample template definition 702, according to an embodiment of the present invention.

As detailed herein, one or more embodiments of the invention include TWAF components for template extensions. TWAF provides support for extension of its template schema to enable other developers and vendors to create template definitions specific to their needs and requirements. For this purpose, one or more embodiments of the invention define the notion of TWAF component as a collection of artifacts that put together enable new VoiceSite functionality to be introduced into the TWAF framework. These artifacts can include schema extensions, as well as executable code and related configuration files needed for the integration to happen.

Additionally, a number of actions need to be performed for creation of a VoiceSite template instance from the corresponding VoiceSite template definition. For example, a user needs to select the components and/or features available in the template definition that s/he needs in her VoiceSite. Also, each selected component has to be configured if required by the component. For instance, a list of messages that the component may need will be configured to specify maximum number of messages to hold. In addition, selected components need to be customized by the user to reflect his/her organization, enterprise or own personality. For instance, the prompts (if output is VUI) could be recorded in local language and may speak out the name and address of the enterprise that the user owns. The interface provided to the user to perform these actions could be a VUI or a GUI. In either case, the TWAF framework needs to provide a meta-application (that is, a meta-VoiceSite or a meta-website) for exposing the user interface to create a template instance. This meta-application could be generated from the template definition or could be developed manually when a new template definition is created.

As a result of this selection and configuration process, a new XML document can be generated. Further, the TWAF framework can also generate configuration files that specify the mapping from component names used in the template to actual code and data files that realize those components. The XML document and the configuration file put together form the template instance. A VoiceSite template instance also needs to be instantiated and executed in a run-time engine for others to be able to access it.

Figure 8:
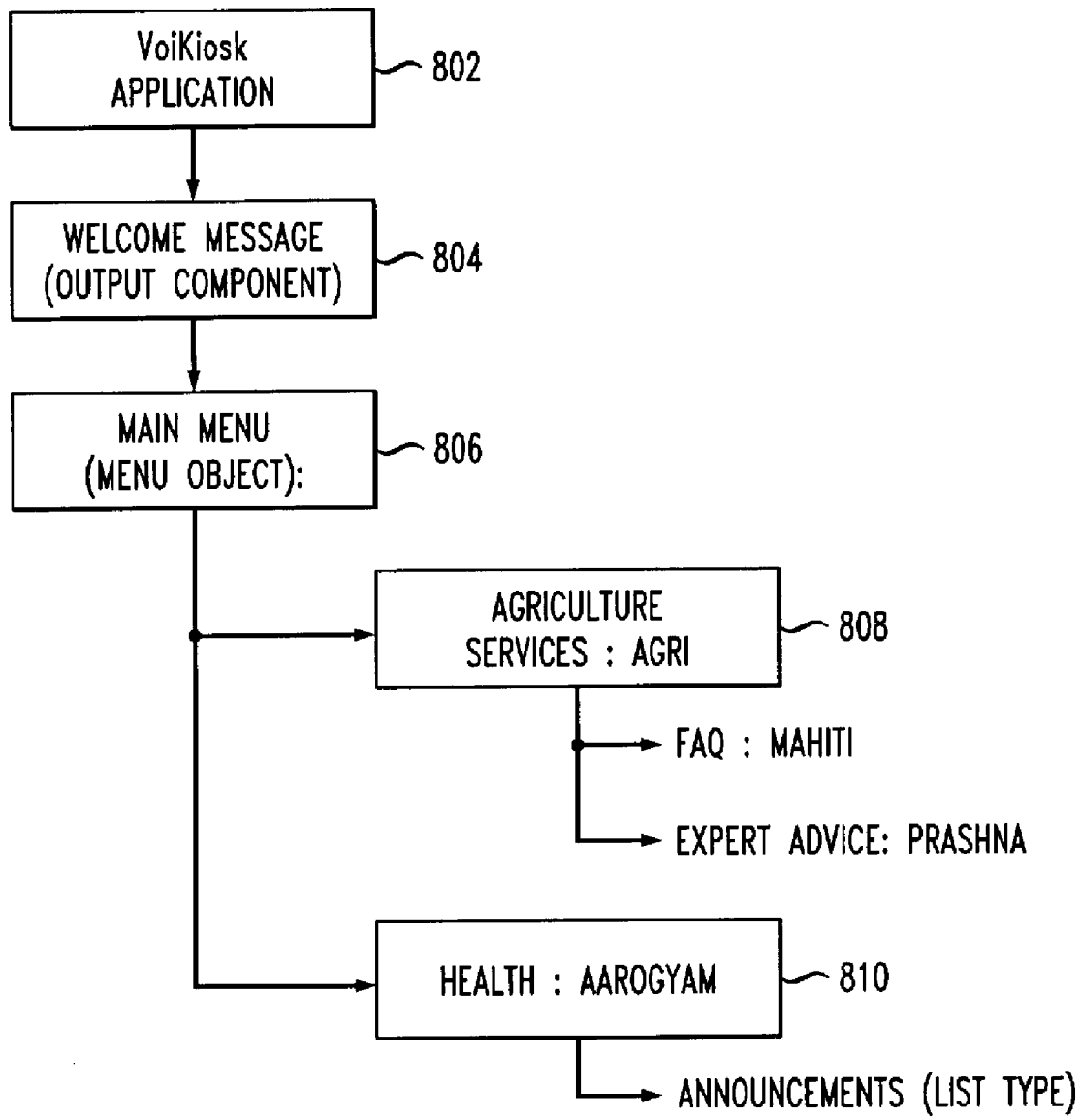
FIG. 8 is a diagram illustrating an example call flow of a Community Portal VoiceSite, according to an embodiment of the present invention.

FIG. 8 is a diagram illustrating an example call flow of a Community Portal VoiceSite, according to an embodiment of the present invention. By way of illustration, FIG. 8 depicts a progression from a VoiKiosk application 802, to a welcome message (output component 804), to a main menu (menu object) 806, to agriculture services (including FAQ and expert advice) 808 and/or health services (including announcements) 810.

FIG. 8 illustrates an instance of the Community Portal template created by selecting the agricultural services and the health service only. The services are labeled by the user as Agri and Aarogyam, respectively.

FIG. 9 is a diagram illustrating a screenshot 902 of the corresponding XML file to the example Community Portal template instance, according to an embodiment of the present invention.

Figure 10:
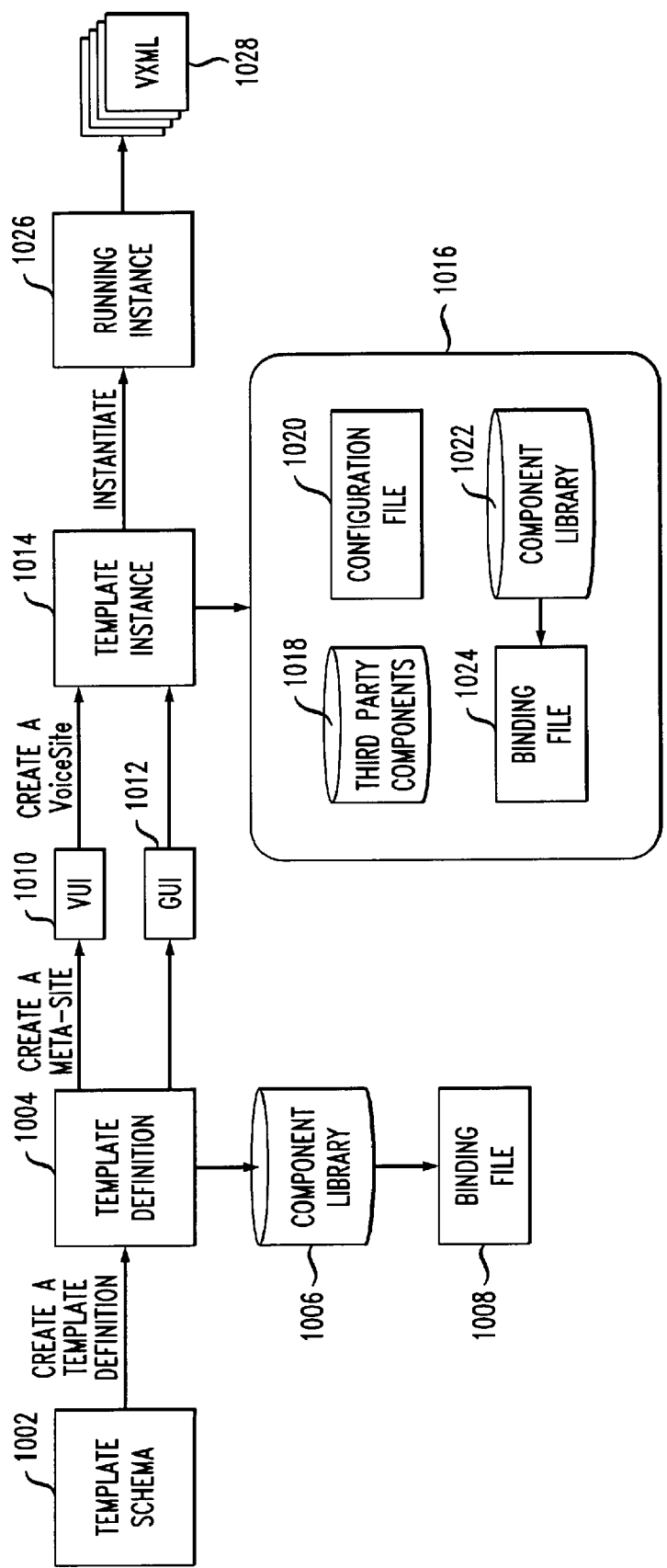
FIG. 10 is a diagram illustrating a TWAF detailed design, according to an embodiment of the present invention.

FIG. 10 is a diagram illustrating a TWAF detailed design, according to an embodiment of the present invention. By way of illustration, FIG. 10 depicts a template schema 1002, which is used to create a template definition 1004, which provides input to a component library 1006 and a binding file 1008. The template definition 1004 is also used to create a meta-site via a VUI 1010 and/or a GUI 1012, and further used to create a template instance 1014.

The template instance can provide input to component 1016, which includes third party components 1018, a configuration file 1020, a component library 1022 and a binding file 1024. Additionally, the template instance 1014 instantiates a running instance 1026, which can provide for VXML 1028.

As depicted in FIG. 10, the framework needs a template schema with which to start. The framework also uses a library or repository of components and services that contains component code and stub code, respectively. The template definition relies on this library to create the template. A binding file contains the mapping from the component name to the code module that realizes the component functionality. In addition, the framework can have a component registry which contains an entry for all components (default components of TWAF as well as those added by others). It can be looked up to determine whether a particular component exists in the repository.

In one or more embodiments of the invention, TWAF's run-time engine can be based upon Speakright, an open source Java based framework for rapid development of voice applications using VoiceXML (VXML) and web applications using HTML.

As described herein, extension of existing VTDL constructs can be performed through the use of extended templates in the form of TWAF components. An exemplary TWAF component package can include the following: 1) a schema file specifying extensions to basic constructs defined in VTDL and needed to interpret this component. Only extensions of existing components are allowed rather than arbitrary additions. 2) A Java archive file (jar) containing either the entire component code or the stub code for the component. The stub code can include the Speakright code corresponding to the flow object being represented by the component and the application logic such as interaction with a data source. To provide protected variation, one or more embodiments of the invention define an interface for the interaction of the component with the data source, keeping in mind the input/output requirements of the component. The jar for each component includes the class implementing this interface. 3) A set of prompt files, grammar files and audio files which are used by the stub code. 4) A binding file providing a mapping of component names used in the template definition to the Java classes from the jar implementing the component as well as the prompt files, grammar files and audio files used by the component. 5) A deployment descriptor specifying the locations for all of the above files.

Once an externally created TWAF component is imported into TWAF, the framework updates its component registry. When a template definition is being created, the TWAF framework exposes all the components, that is, the default ones as well as extended ones obtained by searching for the extended templates in the component registry. The registry specifies the location of the extended template in the TWAF component repository.

The TWAF registry and TWAF repository can be part of the framework architecture. The TWAF repository contains all the extended templates. Once the extended template definition gets included in the template definition, the rest of the steps carried out to instantiate a VoiceSite are the same as the ones followed during VoiceSite creation. FIG. 6, described above, illustrates an exemplary VoiceSite template created to enable end users to create different portals for different villages.

As detailed herein, one or more embodiments of the invention include VoiceSite template creation. By way of example, a VoiceSite template can be created using TWAF components. TWAF components can include, a schema file specifying extensions to basic constructs defined in VTDL and needed to interpret this component. Only extensions of existing components are allowed rather than arbitrary additions. Additionally, TWAF components can include a Java archive file (jar) containing either the entire component code or the stub code for the component. The code represents the application logic of the component. Further, TWAF components can include a set of prompt files, grammar files and audio files which are used by the stub code.

One or more embodiments of the invention also include a binding file providing a mapping of component names used in the template definition to the Java classes from the jar implementing the component as well as the prompt files, grammar files and audio files used by the component.

In one or more embodiments of the invention, additionally, instantiation of a VoiceSite from the corresponding template definition can include the following activities:

1) Component selection: During instantiation, users can customize the template definition and select a subset of its features. The component selection module can be GUI based or VUI based. The user selects the desired features and fills in the label attribute of the component. This value is used when grammars need to be generated. Also, once the components are selected, a new XML document is generated with the selected components and fed into the next step.

2) Grammar generation: A composite component that has a CompositeChoice or a choice component requires a grammar which specifies the word to be spoken by the user to select a component belonging to the choice component. The template definition specifies only the names of the components. The component labels that were populated by the user can be used to generate the appropriate grammars by the grammar generation module. Grammars are generated only for CompositeChoice components. For the leaf components, if a grammar is required it is provided by the user and specified in the application configuration file.

3) Application generation: In this stage, in addition to the template instance XML document and the grammar files, the binding file and the configuration file are also used. As described earlier, while the binding file provides mapping from component names to corresponding java classes, the configuration file specifies parameters specific to components as well as home location for the generated grammars and location of audio files required for the application. During this stage, each component in the instance XML is parsed by a component parser and a Speakright class representing the component flow is generated. The composite components result in a composite flow that contains sub-flows corresponding to each component. The root flow represents the entire application and is now ready to execute. FIG. 8 and FIG. 9 illustrate a template instance for a Community Portal application.

In a proof-of-concept (PoC) implementation, an exemplary embodiment of the invention developed a voice user interface (VUI) based module to enable the users to create a template instance from the template definition. As detailed herein, an instance of the Community Portal template was created. The user can select the features desired from the template and provide the labels for the features selected. Once the user selects the desired features and labels them, the grammar for CompositeChoice components is generated by a grammar generator using labels. The grammar generator can make use of castor for this purpose. Additionally, the application generator can parse each component and set the prompt file, grammar file and the Speakright class implementing each leaf component to produce an executable Community Portal VoiceSite. CompositeChoice components are instances of a MenuFlow class in Speakright while CompositeSequence components are instances of a BasicFlow Speakright class which implements its sub-flows sequentially.

In one or more embodiments of the invention, a VoiceSite is deployed on an application server and rendered using a voice browser. By way of example, one can use a Tomcat application server and the Genesys browser to deploy the generated voice applications. Each voice application has a phone number associated with it which acts as its uniform resource identifier (URI). End users dial this phone number to access the voice application.

The mapping between the phone number and the application is provided in the Genesys voice platform (GVP) or an alternate voice browser. For each application that is created, a deployment descriptor points to the location where the VXML code generated by the voice application is deployed on Tomcat. The deployment descriptor also assigns a number for this application and configures the GVP accordingly. These VXML files (for example, as shown in FIG. 11) are used by the Genesys browser and rendered when a user dials the number for the desired voice application.

FIG. 11 is a diagram illustrating a sample VXML generated by Speakright 1102, according to an embodiment of the present invention.

As described herein, one or more embodiments of the invention provide an API/GUI interface for creating VoiceSite templates, as well provide meta-VoiceSites that have a voice based interface for users to create their own VoiceSites. The TWAF framework detailed herein also provides support for extension by third party component providers.

Figure 12:
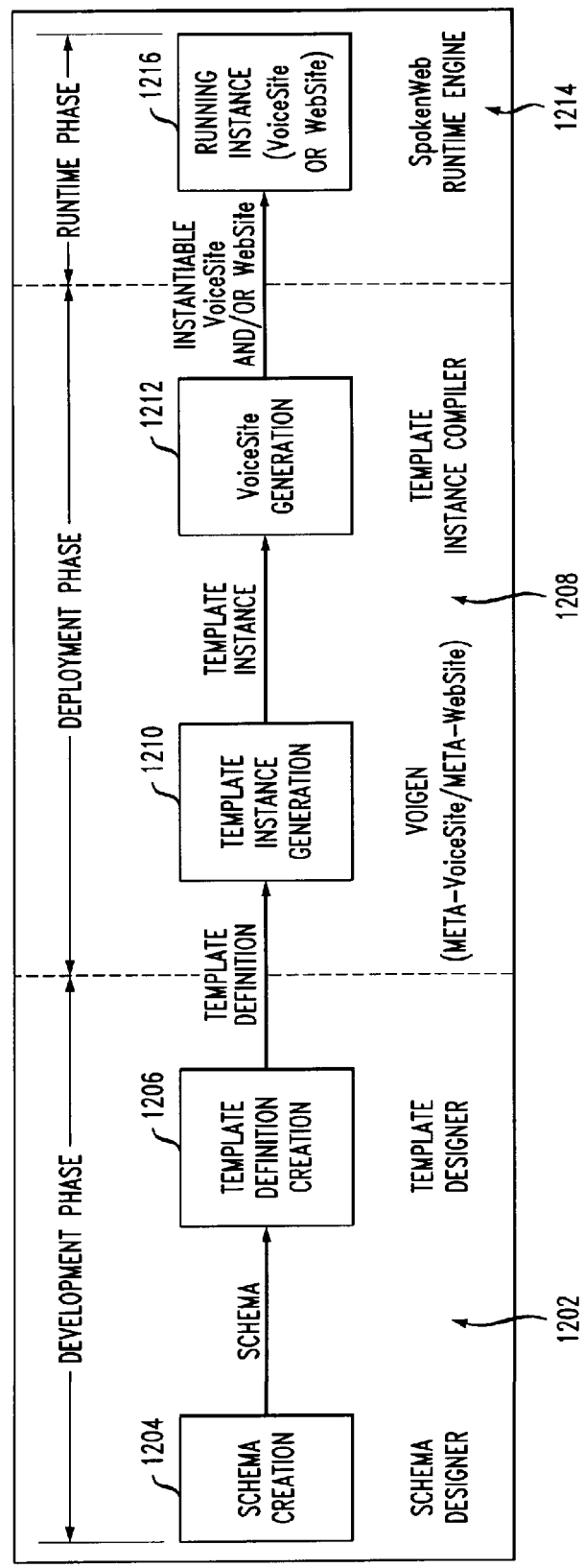
FIG. 12 is a diagram illustrating spoken web architecture, according to an embodiment of the present invention.

FIG. 12 is a diagram illustrating spoken web architecture, according to an embodiment of the present invention. By way of illustration, FIG. 12 depicts a development phase 1202, which includes schema creation 1204 and template definition creation 1206. FIG. 12 also depicts a deployment phase 1208, which includes template instance generation 1210 and VoiceSite generation 1212. Further, FIG. 12 depicts a runtime phase 1214, which includes a running instance 1216.

The spoken web architecture is depicted in the workflow in FIG. 12. It has a total of three phases covering the entire life-cycle of VoiceSite development, deployment and implementation. The development phase involves creation of generic VoiceSite templates (that is, template definitions) that can later be used to create different VoiceSites. Template definitions are XML based files conforming to the spoken web template schema along with data in a spoken web configuration database. The development phase includes a schema designer/editor tool and a template definition editor/designer tool that are used to create template definitions.

The deployment phase starts with a template definition as input and gathers customization and configuration parameters from VoiceSite owners. This can be performed either through a voice interface or a web interface and the module performing this task is effectively either a meta-VoiceSite or a meta-Website. This component is referred to as VoiGen and is perceived by VoiceSite creators as the VoiceSite creator system. The customization and configuration parameters are captured in a XML file along with configuration tables in a spoken web database. This constitutes a template instance. In the deployment phase, the template instance is used along with available component implementations to create a deployable VoiceSite. The run-time phase hosts and implements the VoiceSite(s) using various infrastructural components.

One or more embodiments of the invention can also include a template schema, which is used to create a template definition, which is used to create a template instance, which is used to instantiate a running instance. Additionally, by way of example, a template definition can be created by developers (via an API or a GUI), and can be used by developers (via an API or GUI) or others users (for example, naïve users) (via a VUI). Also, a template instance can be created by developers (via an API or a GUI) or other users (via a VUI), and can be used by developers (via an API or GUI) or others users (via a VUI). Further, a running instance can be created automatically via a VoiGen deployer, and can be used by end callers (via a VUI).

Additionally, in one or more embodiments of the invention, TWAF can have a 4-stage architecture to enforce a systematic approach for the entire VoiceSite development process. Each stage covers a part of the VoiceSite development lifecycle. The first stage is involved with providing a language for VoiceSite designers to specify new VoiceSite designs. In that context, TWAF acts as a template framework, and includes a VoiceSite template definition language (VTDL) for creating VoiceSite template definitions. These template definitions capture the UI and functional aspects of the desired class of VoiceSites to be generated.

The later stages enable generation of end-user VoiceSites based upon these templates. Once a VoiceSite template definition has been created, one or more embodiments of the invention use it to generate a meta-VoiceSite (or a meta-website) that enables an end-user to create his desired VoiceSite. This step configures the template definition with end-user specific information and results into generation of a template instance. The template instance is specification of a deployable VoiceSite.

The last stage of the TWAF architecture uses this template instance specification to generate the appropriate content for the run-time engine. TWAF's template engine is capable of generating voice extensible markup language (VXML) (for generating VoiceSites) as well hyper-text markup language (HTML) (for generating equivalent web sites).

One or more embodiments of the invention use VoiceSite template definition language (VTDL) XML based language to define a class of voice applications each represented by a VoiceSite template. A template definition is created using VTDL to specify a class of voice applications. Also, a template definition specifies the UI components of the application and how they are interlinked to form an application flow. A template definition is also instantiated to create a VoiceSite Instance, wherein an instance includes all or a subset of components from the definition. Each component selected is configured by the user. Further, the template instance is then deployed on a telephony platform and implemented.

Figure 13:
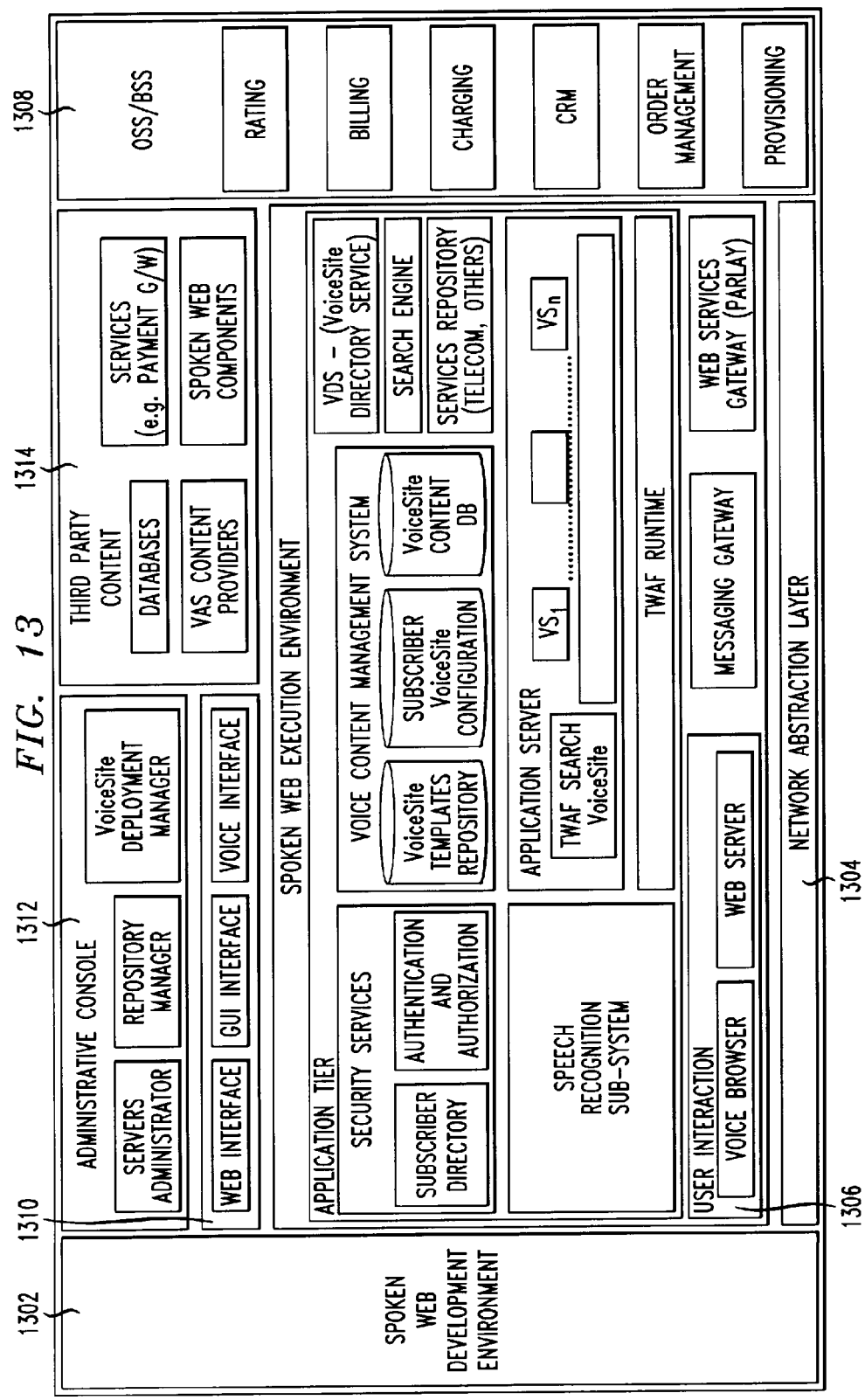
FIG. 13 is a diagram illustrating an overall view of a run-time environment of a spoken web deployment, according to an embodiment of the present invention.

FIG. 13 is a diagram illustrating an overall view of a run-time environment of a spoken web deployment, according to an embodiment of the present invention. By way of illustration, FIG. 13 depicts a spoken web development environment 1302, as well as a network abstraction layer 1304, which includes a subsystem that encapsulates the entire network functionality including components such as various servers, gateways, etc. The OSS/BSS subsystem 1308 provides access to the enterprise support systems such as rating, billing, customer relationship management (CRM), order management, charging and provisioning. The administrative console 1312 subsystem provides different interfaces to administrator users to be able to track and manage the operation of servers, content repositories and VoiceSite deployment configuration. Specifically, in component 1310, one or more of a web based, voice based or GUI console based interface can be supported for different purposes.

The third party content subsystem 1314 includes components that are not core to the spoken web platform. These can include, for example, value-added service (VAS) content providers, external services and databases as well as spoken web components supplied as plug-ins by external vendors. The spoken web execution environment 1306 subsystem defines the core of the spoken web run-time architecture and can include, for example, the following subcomponents.

Messaging Gateway: The messaging gateway provides an interface to the short message service center (SMSC) and multimedia messaging service center (MMSC) hosted on the network abstraction layer. Any SMS/MMS related operations such as send, receive can be performed through this gateway.

Web Services Gateway: This gateway enables a telecom company's network elements such as home location register (HLR) to be accessed through the PARLAY application programming interface (API). These elements are exposed as web services and can be accessed by the core spoken web components, as well as third party content providers.

User Interaction Tier: This layer forms the front end of the spoken web run-time environment. It presents the relevant interface to the end users and routes their requests to the TWAF run-time. Users can either call-in or submit requests through a web interface. Specifically, the voice front-end can be made available through the use of voice browser software such as Genesys voice platform. The web interface can be made available through a web server such as websphere application server (WAS) or Tomcat.

Application Tier: This is the core of the spoken web execution environment, and can include components such as, for example, TWAF run-time, application server, speech recognition subsystem, security services, voice content management system, VoiceSite directory service, search engine, and services repository.

Figure 14:
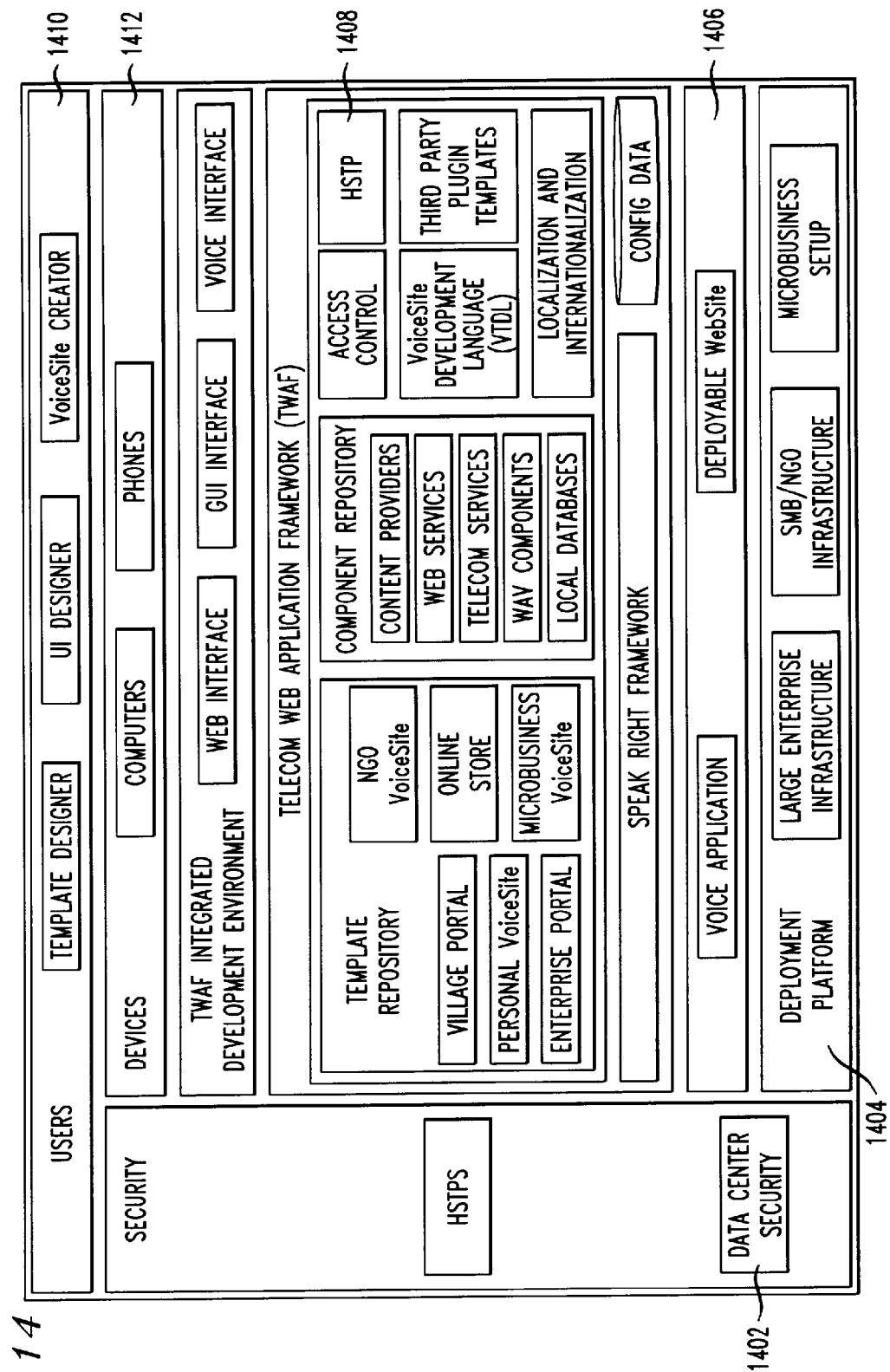
FIG. 14 is a diagram illustrating spoken web development framework architecture, according to an embodiment of the present invention.

FIG. 14 is a diagram illustrating spoken web development framework architecture, according to an embodiment of the present invention. By way of illustration, FIG. 14 depicts a security component 1402 (which includes, for example, a data center security), and a deployment platform 1404 (which includes large enterprise infrastructure, SMB/NGO infrastructure and microbusiness setup). Also, FIG. 14 depicts a component 1406 that includes a voice application and a deployable web site. FIG. 14 additionally includes devices 1412 (including computers and phones) as well as users 1410 (including a template designer, a UI designer and a VoiceSite creator). Further, FIG. 14 depicts a telecom web application framework development environment 1408.

The spoken web development framework 1408 depicted in FIG. 14 captures the components needed for the development and deployment phases of the spoken web workflow. By way of example, various kinds of users of the framework are shown in the user layer.

The TWAF forms the core of the development environment and includes the following items:

A template repository, which stores various kinds of template definitions created by the template designers to cater to different kinds of requirements.

A component repository, which includes various components that can be used while defining templates. The components can include, for example, local databases, web access thru voice components, telecom services and web services.

Access control module, which provides the access control functionality that is used by various VoiceSites for authentication and authorization.

VoiceSite template development language (VTDL), which is the schema language using which new VoiceSite templates are defined.

Third party plugin templates, which are spoken web components developed by third party component providers to be plugged in to the spoken web run-time. These components can either reuse the basic schema components in VTDL or extend those to create their own. The components conform to the prescribed specification of spoken web components.

Localization and internationalization module, which takes care of managing different language/dialect settings, as well as any other parameters that are geography dependent.

Hyperspeech transfer protocol (HSTP) module, which provides the functionality offered by hyperspeech transfer protocol that is used to enable hyperlinks in VoiceSites.

Configuration database, which stores the content related to the configuration of various VoiceSites.

A run-time engine (for example, Speakright) that deploys and implements voice components.

Figure 15:
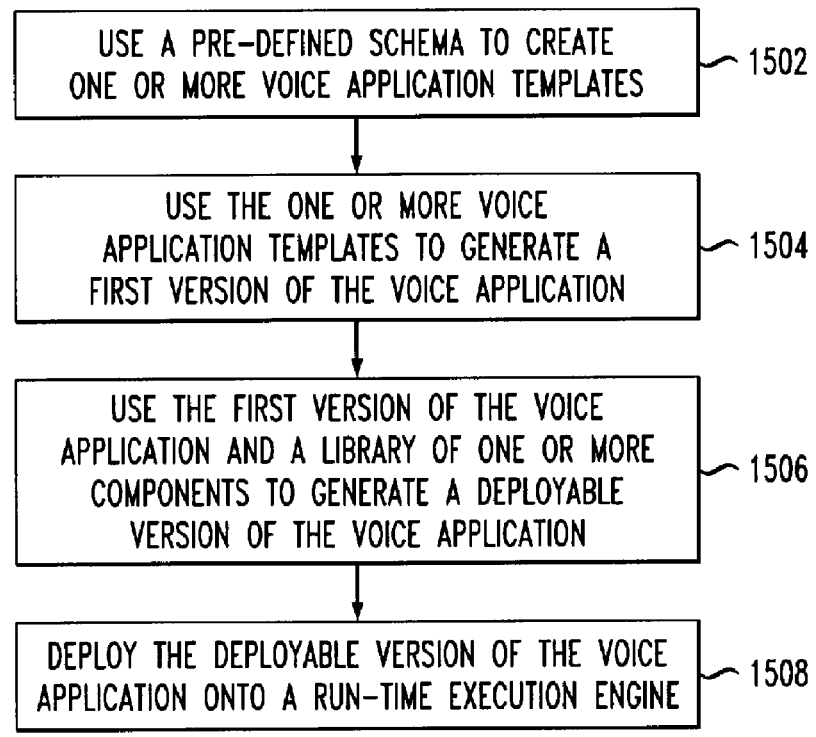
FIG. 15 is a flow diagram illustrating techniques for creating a voice application in a world wide telecom web (WWTW), according to an embodiment of the invention.

FIG. 15 is a flow diagram illustrating techniques for creating a voice application (for example, a VoiceSite and/or equivalent websites) in a world wide telecom web (WWTW), according to an embodiment of the present invention. Step 1502 includes using a pre-defined schema to create one or more voice application templates (see, for example, FIG. 2). Creating voice application templates can include using an extensible markup language (XML) based language (for example, VoiceSite template definition language). Using an extensible markup language (XML) based language can additionally include, for example, creating the voice application templates via a template developer through an application programming interface (API), as well as creating the voice application templates via a template developer through a graphical user interface (GUI).

Step 1504 includes using the one or more voice application templates to generate a first version of the voice application (for example, a meta-voice application or meta-site). Using the voice application templates to generate a first version of the voice application (for example, a meta-voice application or meta-website) can include using a graphical user interface (GUI), an application programming interface (API) and/or a voice user interface (VUI). Also, using the voice application templates to generate a first version of the voice application can include selecting a subset of components in the voice application templates and configuring the subset of components.

Also, using the voice application templates to generate a first version of the voice application can include using a template parser to interpret the templates and one or more components corresponding to the voice application templates.

Step 1506 includes using the first version of the voice application (for example, meta-voice application or meta-website) and a library of one or more components (for example, pre-built components) to generate a deployable version of the voice application (also referred to, for example, as the generated site). The components can include, for example, voice user interface (VUI) components (such as audio playback, Test-to-Speech translation, interfaces to databases, web services etc.) and voice components for receiving input (for example, from users, among others). Using the first version of the voice application and a library of components to generate a deployable version of the voice application can include configuring the first version of the voice application, as well as creating configuration files and generating container components for execution on a run-time engine. These can include, for example, grammar files and/or prompts, as well as a customized version of the template (that is, a VoiceSite instance description file) based upon inputs given in the first voice site. Also, configuring the first version of the voice application can include presenting an interface to a user to configure the first version of the voice application.

Step 1508 includes deploying the deployable version of the voice application onto a run-time execution engine. The techniques depicted in FIG. 15 can also include automatically deploying the deployable version of the voice application onto a voice platform and/or a web platform. Deploying the deployable version onto a desired platform can include, for example, using deployment descriptors to copy one or more components of the voice application into corresponding deployment folders, and configuring the target platform to recognize the deployable version of the voice application. Deployment descriptors can include information such as the remote server to deploy to and the access privileges thereon, the location and names of prompts and grammar files to be picked up and included, the components from the component repository to be included, the database configuration, etc.

As described herein, in one or more embodiments of the invention, the first version of the voice application can be a voice site and the deployable version of the voice application can be a voice site. The first version of the voice application can be a voice site and the deployable version of the voice application can be a website. Also, the first version of the voice application can be a voice site and there can be two deployable versions of the voice application that include a website and a voice site. Additionally, the first version of the voice application can be a website and the deployable version of the voice application can be a website. The first version of the voice application can be a website and the deployable version of the voice application can be a voice site. Further, the first version of the voice application can be a web site and there can be two deployable versions of the voice application that include a website and a voice site.

Additionally, one or more embodiments of the invention can include extending voice application definition language (for example, VoiceSite definition language) with one or more components to enable creation of extended templates. The extended templates can include a mechanism to enhance the capabilities of the platform without having to change the deployed system. Such a mechanism can provide facilities using which owners of a TWAF deployment can extend TWAF schema, implement new components and be able to add it to their deployment. This provides powerful extensibility and flexibility to the system's capabilities. The techniques depicted in FIG. 15 can also include adding one or more third party components to the library.

Also, as described herein, one or more embodiments of the invention include creating VoiceSites through a voice interface. Such techniques can additionally include the use of modalities such as, for example, GUI, API, web, etc. for meta-VoiceSites and/or end VoiceSites.

The techniques depicted in FIG. 15 can also, as described herein, be provide a system, wherein the system includes distinct software modules, each of the distinct software modules being embodied on a tangible computer-readable recordable storage medium.

Additionally, the techniques depicted in FIG. 15 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

A variety of techniques, utilizing dedicated hardware, general purpose processors, firmware, software, or a combination of the foregoing may be employed to implement the present invention or components thereof. One or more embodiments of the invention, or elements thereof, can be implemented in the form of a computer product including a computer usable medium with computer usable program code for performing the method steps indicated. Furthermore, one or more embodiments of the invention, or elements thereof, can be implemented in the form of an apparatus including a memory and at least one processor that is coupled to the memory and operative to perform exemplary method steps.

Figure 16:
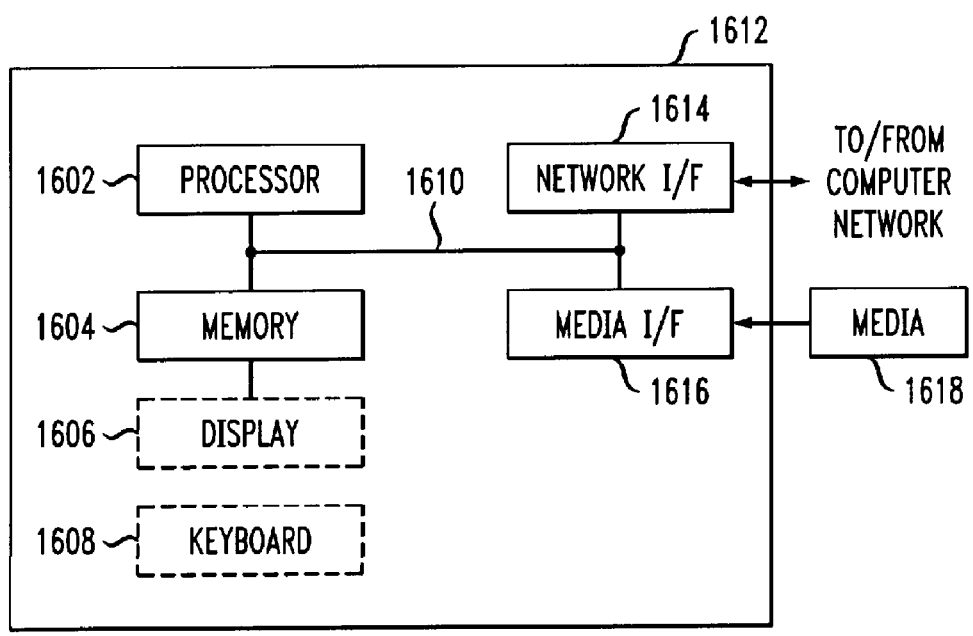
FIG. 16 is a system diagram of an exemplary computer system on which at least one embodiment of the invention can be implemented.

One or more embodiments can make use of software running on a general purpose computer or workstation. With reference to FIG. 16, such an implementation might employ, for example, a processor 1602, a memory 1604, and an input/output interface formed, for example, by a display 1606 and a keyboard 1608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 1602, memory 1604, and input/output interface such as display 1606 and keyboard 1608 can be interconnected, for example, via bus 1610 as part of a data processing unit 1612. Suitable interconnections, for example via bus 1610, can also be provided to a network interface 1614, such as a network card, which can be provided to interface with a computer network, and to a media interface 1616, such as a diskette or CD-ROM drive, which can be provided to interface with media 1618.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

Furthermore, the invention can take the form of a computer program product accessible from a computer-usable or computer-readable medium (for example, media 1618) providing program code for use by or in connection with a computer or any instruction implementation system. For the purposes of this description, a computer usable or computer readable medium can be any apparatus for use by or in connection with the instruction implementation system, apparatus, or device. The medium can store program code to implement one or more method steps set forth herein.

The medium can be an electronic, magnetic, optical, electromagnetic, infrared, or semiconductor system (or apparatus or device) or a propagation medium. Examples of a tangible computer-readable storage medium include a semiconductor or solid-state memory (for example memory 1604), magnetic tape, a removable computer diskette (for example media 1618), a random access memory (RAM), a read-only memory (ROM), a rigid magnetic disk and an optical disk (but exclude a propagation medium). Current examples of optical disks include compact disk-read only memory (CD-ROM), compact disk-read/write (CD-R/W) and DVD.

A data processing system suitable for storing and/or executing program code will include at least one processor 1602 coupled directly or indirectly to memory elements 1604 through a system bus 1610. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 1608, displays 1606, pointing devices, and the like) can be coupled to the system either directly (such as via bus 1610) or through intervening I/O controllers (omitted for clarity).

Network adapters such as network interface 1614 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 1612 as shown in FIG. 16) running a server program. It will be understood that such a physical server may or may not include a display and keyboard.

In one or more embodiments of the invention, computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the invention have been described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a tangible computer-readable storage medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be implemented substantially concurrently, or the blocks may sometimes be implemented in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, it should be noted that any of the methods described herein can include an additional step of providing a system comprising distinct software modules embodied on a tangible computer readable storage medium; the modules can include any or all of the components shown in the figures described herein. The method steps can then be carried out using the distinct software modules and/or sub-modules of the system, as described above, executing on a hardware processor. Further, a computer program product can include a tangible computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

At least one embodiment of the invention may provide one or more beneficial effects, such as, for example, creating, deploying and managing interactive telecom web applications (that is, VoiceSites) as well as meta-telecom web applications, and meta-VoiceSites or meta websites that are used to configure and instantiate templates into VoiceSites or websites.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art.

What is claimed is:

1. A method for creating a voice application in a world wide telecom web (WWTW), wherein the method comprises:
   using a pre-defined schema to create one or more voice application templates;
   using the one or more voice application templates to generate a first version of the voice application;
   using the first version of the voice application and a library of one or more components to generate a deployable version of the voice application; and
   automatically deploying the deployable version onto at least one of a voice platform and a web platform by using one or more deployment descriptors to copy one or more components of the voice application into corresponding deployment folders and configuring a target platform to recognize the deployable version.

2. The method of claim 1, wherein the first version of the voice application is a voice site and the deployable version of the voice application is a voice site.

3. The method of claim 1, wherein the first version of the voice application is a voice site and the deployable version of the voice application is a website.

4. The method of claim 1, wherein the first version of the voice application is a voice site and there are two deployable versions of the voice application comprising a website and a voice site.

5. The method of claim 1, wherein the first version of the voice application is a website and the deployable version of the voice application is a website.

6. The method of claim 1, wherein the first version of the voice application is a website and the deployable version of the voice application is a voice site.

7. The method of claim 1, wherein the first version of the voice application is a web site and there are two deployable versions of the voice application comprising a website and a voice site.

8. The method of claim 1, wherein using the one or more voice application templates to generate a first version of the voice application comprises selecting a subset of components in the one or more voice application templates and configuring the subset of components.

9. The method of claim 1, wherein the one or more components comprise at least one of voice user interface (VUI) components and voice components for receiving input.

10. The method of claim 1, wherein creating one or more voice application templates comprises using an extensible markup language (XML) based language.

11. The method of claim 10, wherein using an extensible markup language (XML) based language further comprises creating the one or more voice application templates via a template developer through an application programming interface (API).

12. The method of claim 10, wherein using an extensible markup language (XML) based language further comprises creating the one or more voice application templates via a template developer through a graphical user interface (GUI).

13. The method of claim 1, wherein using the one or more voice application templates to generate a first version of the voice application comprises using at least one of a graphical user interface (GUI), an application programming interface (API) and a voice user interface (VUI).

14. The method of claim 1, wherein using the one or more voice application templates to generate a first version of the voice application comprises using a template parser to interpret the one or more templates and one or more components corresponding to the one or more voice application templates.

15. The method of claim 1, wherein using the first version of the voice application and a library of one or more components to generate a deployable version of the voice application comprises:

configuring the first version of the voice application, wherein configuring the first version of the voice application comprises presenting an interface to a user to configure the first version of the voice application; and creating one or more configuration files and generating one or more container components for execution on a run-time engine.

16. The method of claim 1, further comprising extending voice application definition language with one or more components to enable creation of one or more extended templates.

17. The method of claim 1, further comprising adding one or more third party components to the library.

18. A computer program product comprising a tangible computer readable recordable storage medium including computer useable program code for creating a voice application in a world wide telecom web (WWTW), the computer program product including:

computer useable program code for using a pre-defined schema to create one or more voice application templates;

computer useable program code for using the one or more voice application templates to generate a first version of the voice application;

computer useable program code for using the first version of the voice application and a library of one or more components to generate a deployable version of the voice application; and computer useable program code for automatically deploying the deployable version onto at least one of a voice platform and a web platform by using one or more deployment descriptors to copy one or more components of the voice application into corresponding deployment folders and configuring a target platform to recognize the deployable version.

19. A system for creating a voice application in a world wide telecom web (WWTW), comprising:

a memory; and at least one processor coupled to the memory and operative to:

use a pre-defined schema to create one or more voice application templates;

use the one or more voice application templates to generate a first version of the voice application;

use the first version of the voice application and a library of one or more components to generate a deployable version of the voice application; and automatically deploy the deployable version onto at least one of a voice platform and a web platform by using one or more deployment descriptors to copy one or more components of the voice application into corresponding deployment folders and configuring a target platform to recognize the deployable version.

* * * * *